US008812152B1

(12) United States Patent
Giloh et al.

(10) Patent No.: US 8,812,152 B1
(45) Date of Patent: Aug. 19, 2014

(54) METHOD AND APPARATUS FOR CHANGING CARRIAGE SPEED ON A CLOSED-LOOP TRACK

(71) Applicant: Tamicare Ltd., Manchester (GB)

(72) Inventors: Ehud Giloh, Manchester (GB); Adam I. Grinshpan, Manchester (GB); Reuven Melamed, Zikhron Ya'akov (IL); Arie Yifrah, Warrington (GB); Thomas Colin Dawber, Lancashire (GB)

(73) Assignee: Tamicare, Ltd., Heywood (GB)

( * ) Notice: Subject to any disclaimer, the term of this patent is extended or adjusted under 35 U.S.C. 154(b) by 17 days.

(21) Appl. No.: 13/774,444

(22) Filed: Feb. 22, 2013

(51) Int. Cl.
*G06F 7/00* (2006.01)
*B65G 43/00* (2006.01)

(52) U.S. Cl.
CPC .................................. *B65G 43/00* (2013.01)
USPC ............ 700/230; 700/228; 700/229; 700/244

(58) Field of Classification Search
None
See application file for complete search history.

(56) References Cited

U.S. PATENT DOCUMENTS

2006/0069470 A1\* 3/2006 Campbell et al. ............... 701/23

\* cited by examiner

*Primary Examiner* — Yolanda Cumbess
(74) *Attorney, Agent, or Firm* — McDonnell Boehnen Hulbert & Berghoff LLP

(57) ABSTRACT

A method and apparatus for managing different traffic speeds of carriages moving along a closed-loop track is disclosed. The closed-loop track has at least four different speed zones, which include a slow speed zone, a fast speed zone, an acceleration zone, and a deceleration zone. A computerized control system monitors and controls the movement of the carriages along the different speed zones of the closed loops track, so different traffic speeds are maintained along the closed loop track, simultaneously, with no collisions.

14 Claims, 3 Drawing Sheets

METHOD AND APPARATUS FOR CHANGING CARRIAGE SPEED ON A CLOSED-LOOP TRACK

BACKGROUND

When different processes are executed on carriages moving on the same track, different speeds may be acquired to the objects at different zones of the track, to facilitate the different processes at the different required speeds.

When using a closed-loop manufacturing system having carriages which are moving along the closed loop rail system, obtaining simultaneously different speeds to the different carriages moving on the same closed-loop track may be a challenge, as a collision will occur eventually.

A known method used to solve this requirement uses mechanical transition units as implemented in power and free conveyer lines such as produced by Paclineconveyors Inc. However, mechanical transition systems usually require the addition of an extended dedicated track external to the main track. In addition, the systems are relatively robust and hefty, thus making a delicate speed synchronization or fast change in parameters considerably limited.

SUMMARY

A method and apparatus for providing different traffic speeds to carriages or groups of carriages moving along a closed-loop track is disclosed.

Some closed loop track based production lines require more than one operation speed or pitch between carriages to allow different types of production processes that vary in duration, speed, line length, etc.

A sophisticated method for real time controlling, monitoring, and adjusting the speed of the carriages moving along various zones of a closed-loop track is also disclosed.

The current application also introduces a new method of using flexible, computerized speed and pitch shifters, configured to desired operation specifications.

The speed/pitch configuration may be constant and steady through the entirety of the production process or, being software driven, variable and adaptable instantly in accordance to preset or real time variations of manufacturing specifications and requirements.

The speed and pitch of the carriages is correlated so that the ratio between the speed at the 'slow' zone and the speed at the 'faster' zone is always equal to the ratio between the pitch at the 'slow' zone and the pitch at the 'faster' zone.

Driving and adjusting the speed of the carriages may be performed by driving means which are external to the carriages, such as motors or pistons. Alternatively, the carriages may be self-driven, by an internal driving device. Driving the carriages may be alternatively performed by any other suitable way known in the art.

The method doesn't, in any way, restrict using any other suitable means for executing the desired process.

Some advantages of the current application include instant configuration of the system by software, there is no need for hardware adjustments and modifications. An infinite number of speed and pitch configurations are possible. Real time monitoring and computerized control enables accurate carriage transition at a high speed. The system facilitates operation in both directions. Small scale or light hardware units can be fitted on a limited space.

In this application the term 'line' relates to closed-loop track having plurality of carriages move along the track.

In this application the terms 'body', 'former', 'item' and 'mold' are interchangeable.

In this application the term pitch relates to the distance between the centers of two adjacent carriages.

The terms belt and chain in this application are interchangeable and usually refer to a toothed belt, timing belt, or driving chain.

In this application the term 'transition unit' refers to both 'acceleration' and 'deceleration' zones.

DETAILED DESCRIPTION

Figure 1:
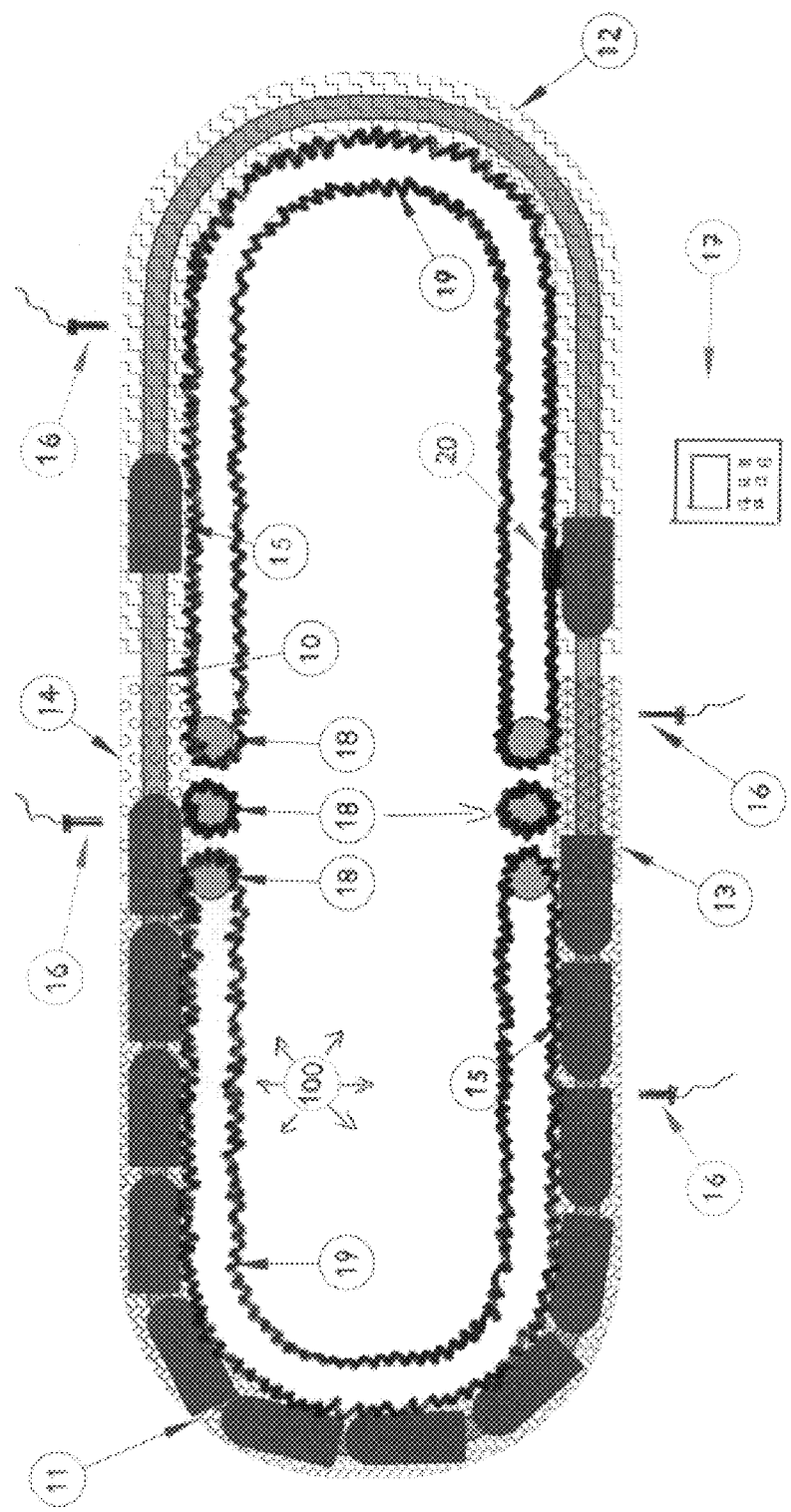
FIG. 1 shows a top view of a closed-loop track including externally driven carriages disclosed in the present application.

The method of the present application is based on a computerized speed control system. The method manages the movement of carriages 15 along a closed-loop track 10, shown in FIG. 1 and FIG. 2. The closed-loop track 10 includes at least four different zones 11, 12, 13, and 14, which may include a slow zone 11, an acceleration zone 13, a fast zone 12, and a deceleration zone 14. The computerized control system 17 controls the carriages movement along the different zones, so that the carriages moving along the slow zone 11 move at a defined speed and pitch, and at the same time the carriages moving along the fast zone 12 are moving at a defined faster speed and larger pitch. The movement of the carriages 15 along the slow zone 11 and the fast zone 12 is performed simultaneously without crashing of carriages moving slowly and carriages moving faster on the same closed-loop track 10. The computerized system 17 monitors and controls, in real time, the carriages' speed, pitch, and location. The speed and the pitch of the carriages are synchronized by the control system 17, so that at the acceleration zone 13, the speed and pitch of the carriages 15 are changed in such a way, that at the end of the acceleration, the carriages' speed and pitch match those of the speed and pitch of the carriages 15 in the fast zone 12. The speed and pitch of the carriages 15 is correlated so that the ratio between the speed at the slow zone 11 and the speed at the fast zone 12 is equal to the ratio between the pitch at the slow zone 11 and the pitch at the fast zone 12. For example, if the speed at the fast zone 12 is equal to three times the speed at the slow zone 11, then the pitch at the fast zone 12 is equal to three times the pitch at the slow zone 11.

The present system allows for fluent and constant traffic with no collisions. At the deceleration zone 13, the carriages' 15 speed and pitch are changed so that at the end of the deceleration the carriages' speed and pitch match the speed and pitch of the slow zone 11, therefore allowing fluent and constant traffic with no collisions.

In one embodiment, shown in FIG. 1, the carriages 15 are driven by an external driving device 18, such as a belt, or a chain, or a pulley, driven by a motor. A piston or any other suitable driving device may be used to drive the carriages 15. In this embodiment, the method also comprises a step of synchronizing with both the slow zone 11 and the fast zone 12. During acceleration, the transition unit synchronizes first with the speed of the slow zone 11, picks up a carriage 15, accelerates, synchronizes the speed with the fast zone 12, and transfers the carriage at the synchronized speed to the fast zone 12. During deceleration, the transition unit synchronizes first with the speed of the fast zone 12, picks up a carriage 15, decelerates, synchronizes with the speed of the slow zone 11, and transfers the carriage at the synchronized speed to the slow zone 11.

Figure 2:
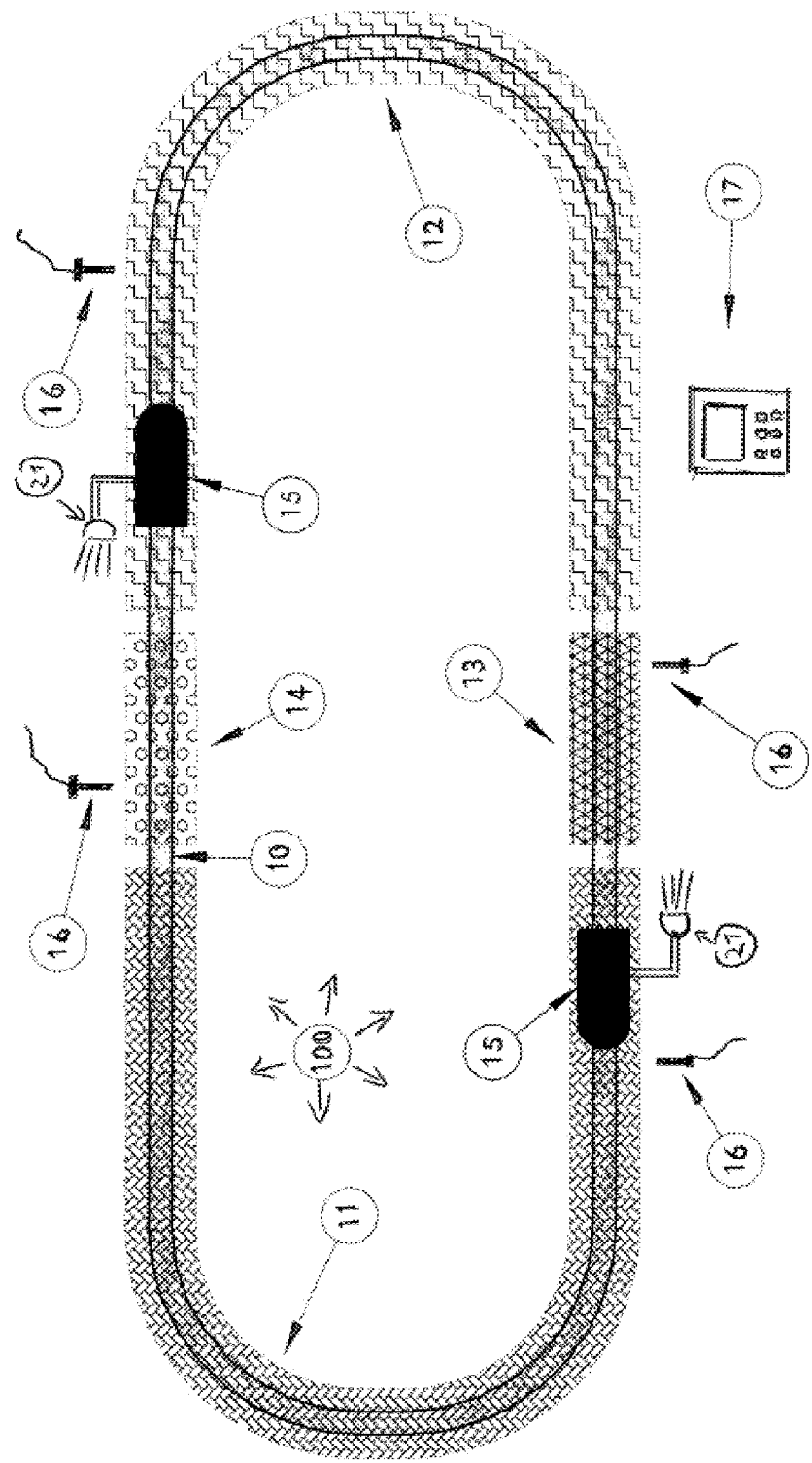
FIG. 2 shows a top view of a closed-loop track including self-driven carriages disclosed in the present application.
Figure 3:
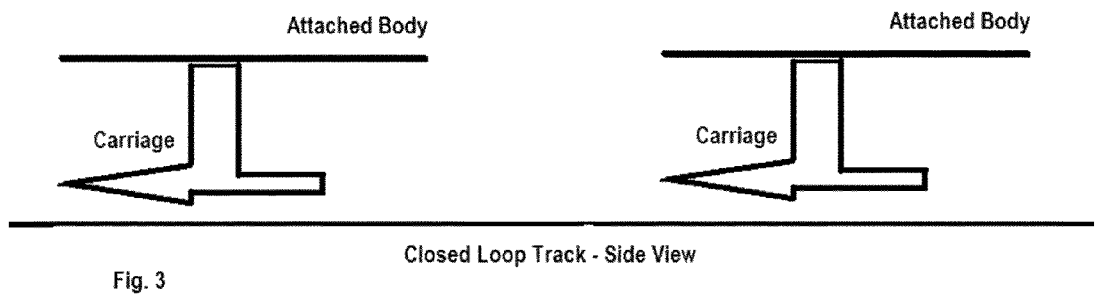
FIG. 3 shows a side view of two adjacent carriages with mounted bodies of the track shown in FIG. 1 and FIG. 2.

In another embodiment, shown in FIG. 2, the carriages 15 are self-driven by an internal driving device 21 such as, but not limited to, motors built into each one of the carriages.

In yet another embodiment the carriages push each other along at least a part of the slow zone 11.

In yet another embodiment, the method comprises a step of using the same closed-loop line in both a clockwise or counterclockwise direction or configuration.

In yet another embodiment, the method comprises the additional step of changing the position or the orientation of the mounted body/s or object/s so to prevent a crash if the object that is mounted on a carriage is too big so that reducing the pitch may create a crash between the mounted objects.

As shown in FIG. 1, a line 100 includes at least two carriages 15 moving simultaneously at different speeds along a closed loop-track 10 when the line is in an operation mode. For example the carriages in the first, slow zone 11 move at speed of one meter in 15 seconds or and at a pitch of 20 centimeters, while the carriages 15 at the second, faster zone 12, move at a speed of one meter in 3 seconds, or five times faster than the carriages at the slow zone) and at a pitch of 100 centimeters (five times larger than the pitch at the slow zone).

In the second zone 12, which may be a fast zone, the carriages 15 move at a faster speed and at a larger pitch.

The third zone 13 may be an acceleration zone in which the carriages 15 are accelerated from the slow zone 11 to match the speed and pitch of the fast zone 12. In the fourth zone 14, which may be a deceleration zone, the carriages 15 are decelerated from the fast zone 12 to match the speed and the pitch of the slow zone 11.

The line 100 further includes one or more sensors 16. The sensors 16 detect the location of the carriages 15 along the closed-loop 10. The sensors 16 may be any sensing device as known in the art, such as, but not limited to, proximity sensors, magnetic sensors, optical sensors, vision systems, or any other suitable sensing device.

The line 100 further comprises a control system 17 which monitors the line 100 operation by retrieving real-time data from the sensors 16 related to the status of the carriages 15 on the closed-loop 10. The control system 17 also controls the acceleration, the deceleration, and the pitch of the carriages 15 along the different zones of the track 10 by sending commands to the carriages external or the internal driving systems. Example computerized control systems are, but not limited to, industrial PLCs, PACs and Motion controllers, manufactured by GE, Mitsubishi, Panasonic, Yaskawa and others One example for suitable controller is 'PACMotion Multi-Axis Motion Controller' by GE.

In one embodiment, shown in FIG. 1, the line 100 may also include a transition unit having independent driving devices 18. The driving devices are capable of synchronizing with both the slow and the fast zones 11, 12. Example driving devices 18 and 19 may include, but are not limited to, variable speed motors, servo motors, step motors, pistons, pulleys, belts, or any other suitable driving device. During acceleration, the transition unit synchronizes first with the speed of the slow zone 11, picks up a carriage 15, accelerates, synchronizes with the speed of the fast zone 12, and transfers the carriage at the synchronized speed to the fast zone 12. During deceleration, the transition unit synchronizes first with the speed of the fast zone 12, picks up a carriage, decelerates, synchronizes with the speed of the slow zone 11, and transfers the carriage at the synchronized speed to the slow zone 11.

A linkage or interface 20 between the carriages 15 and the external driving devices 18 and 19 is provided to allow engagement and disengagement of the carriages 15 to/from the external driving devices 18 and 19, allowing interfacing or switching to another or to the next driving device, such as an adjacent belt, along the zones of the closed-loop track 10.

In another embodiment, the line 100 includes driving devices 21 which are built into the carriages 15, as shown in FIG. 2. Example driving devices 21 may include, but are not limited, variable speed motors, servo motors, pulleys, or any kind of engine or means for self-propulsion. The built-in driving device 21 may be controlled remotely by the control system 17. The internal driving devices 21 may push, pull, or drive the carriages 15 along any zone of the closed-loop 10 as desired.

In yet another embodiment, the carriages 15 may include associated bodies 22 mounted thereto. Possible associated bodies may be, for example, a mold, a work-piece former, or any other carried object. The bodies 22 may be larger than the pitch at any of the segments of the first or slow zone 11.

Figure 4:
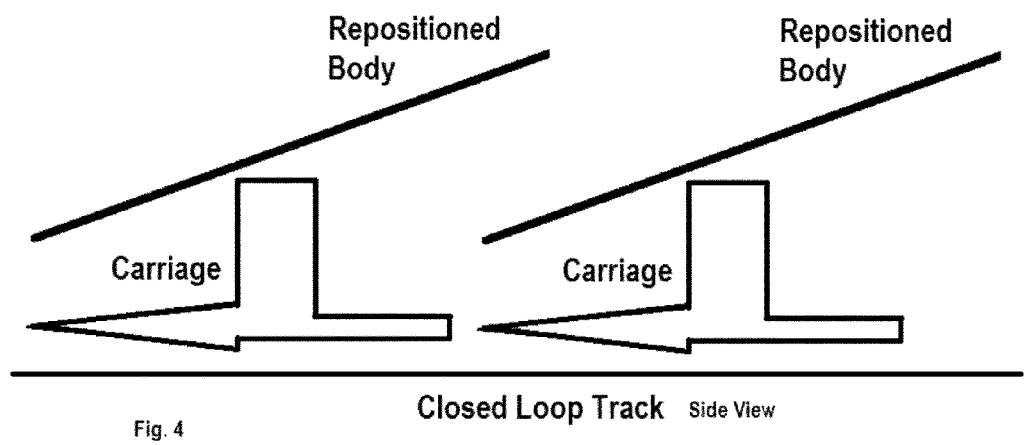
FIG. 4 shows a side view of an alternate embodiment of repositioned bodies mounted on two adjacent carriages of the track shown in FIG. 1 and FIG. 2.

In yet another embodiment, shown in FIG. 4, the mounted bodies 22 are tilted, rotated, or repositioned. In this embodiment, the distance between the carriages 15 is smaller than the body 22, or the gap between the carriages is too small to accommodate the bodies without crashing. The bodies 22 may therefore be repositioned in a more condensed manner, for instance by positioning the bodies in slanted position, or in any other appropriate position allowing movement at the above-mentioned small pitch without collision.

The above mentioned repositioning may be effective to shorten the length of an oven, where a drying process is required, while still allowing movement at a larger pitch in case that a faster movement or a specific body orientation is required during another process carried out on the faster zone, or in case that carriage movement at a fast speed is required in order to meet certain process timings.

We claim:

1. A method, based on a computerized speed control system, for managing movement of a plurality of carriages along a line having a closed-loop track, wherein the closed-loop track comprises a first zone in which the plurality of carriages move at a defined speed and pitch, a second zone wherein the plurality of carriages move at a faster speed and larger pitch in comparison to the first zone, a third zone which is an acceleration zone, and a fourth zone which is a deceleration zone, and wherein the computerized control system controls the carriage movement along each of the zones, so that the plurality of carriages moving along the first zone are moving at a defined speed and pitch, and wherein, at the same time the plurality of carriages moving along the second zone are moving at a defined, faster speed and larger pitch, and wherein said movement of the plurality of carriages along the at least first and second zones is performed simultaneously without collisions;

wherein the computerized system monitors and controls, in real time, the carriages' speed, pitch and location; and wherein the speed and the pitch of the carriages are synchronized by the control system, so that, the ratio between the speed of the plurality of carriages at the first zone and the speed of the plurality of carriages at the second zone is equal to the ratio between the pitch of the plurality of carriages at the first zone and the pitch of the plurality of carriages at the second zone;

at the acceleration zone, the speed and pitch of the plurality of carriages are changed so that at the end of the acceleration, the speed and pitch of the plurality of carriages match the speed and pitch of the plurality of carriages in the second zone, therefore allowing fluent and constant traffic with no collisions; and at the deceleration zone, the speed and pitch of the plurality of carriages are changed so that at the end of the deceleration the speed and pitch of the plurality of carriages match those of the first zone, therefore allowing fluent and constant traffic with no collisions.

2. The method according to claim 1 wherein the speed and pitch ratios are constant and steady during the operation of the line.

3. The method according to claim 1 wherein the speed and pitch ratios are variable and adaptable in accordance with preset or real-time variations of line operation specifications and requirements.

4. The method according to any one of claim 1, 2 or 3 wherein the plurality of carriages are driven by one of the following systems, or a combination of at least two:
   a. external driving devices;
   b. internal driving devices; and
   c. carriages pushing each other along at least a part of the first zone.

5. The method of claim 1 further comprising mounting an object on one or more of the plurality of carriages.

6. The method of claim 5 further comprising changing a position or orientation of the object mounted on the carriage to prevent collision between two adjacent objects and allow a small pitch, therefore reducing total line length.

7. The method of claim 1 further comprising changing a rotation direction of the line.

8. An apparatus based on a computerized speed control system for managing movement of carriages along a line having a closed-loop track, the apparatus comprising:

a closed-loop track having a first zone at which carriages are moving at a defined speed and pitch;

a second zone at which carriages are moving at a faster speed and at a larger pitch in comparison to the first zone;

a third zone at which carriages are accelerated from the first, slower zone to match the speed and pitch of the second, faster zone; and a fourth zone at which carriages are decelerated from the second, faster zone to match the speed and the pitch of the first, slower zone;

wherein at least two of the carriages move simultaneously at different speeds along the closed-loop track;

wherein at least one sensor detects the location of the carriages along the closed-loop track; and wherein a control system monitors the line operation by retrieving real-time data from the at least one sensor, the real-time data being related to at least one of the carriages' speed, the carriages' location, and the carriages' pitch.

9. The apparatus according to claim 8 wherein the carriages are driven by an internal built-in driving device.

10. The apparatus according to claim 8 wherein the carriages are driven by an external driving device.

11. The apparatus according to claim 8 wherein the carriages carry associated bodies.

12. The apparatus according to claim 11 wherein the associated bodies are larger than the pitch at the first zone.

13. The apparatus according to claim 11 or 12 wherein the associated bodies are tilted, rotated, or repositioned in a condensed manner in at least one zone of the closed-loop track.

14. The apparatus of claim 8 wherein the rotation direction of the line may be changed between clockwise and counter clockwise.

\* \* \* \* \*